United States Patent
Hama et al.

(10) Patent No.: US 7,221,401 B2
(45) Date of Patent: May 22, 2007

(54) MONITORING SYSTEM, MONITORING METHOD, AND IMAGING APPARATUS

(75) Inventors: Hideki Hama, Tokyo (JP); Noriyuki Yamashita, Tokyo (JP); Masaaki Kurebayashi, Shizuoka (JP)

(73) Assignee: Sony Corporation, Tokyo (JP)

( * ) Notice: Subject to any disclaimer, the term of this patent is extended or adjusted under 35 U.S.C. 154(b) by 810 days.

(21) Appl. No.: 10/437,583

(22) Filed: May 14, 2003

(65) Prior Publication Data

US 2004/0017470 A1    Jan. 29, 2004

(30) Foreign Application Priority Data

May 15, 2002   (JP)   .............................. 2002-139662

(51) Int. Cl.
*H04N 5/238*   (2006.01)
*H04N 5/225*   (2006.01)

(52) U.S. Cl. ................................... 348/369; 348/218.1
(58) Field of Classification Search ............ 348/218.1, 348/344, 369, 208.11, 208.3, 36, 143; 396/20, 396/24
See application file for complete search history.

(56) References Cited

U.S. PATENT DOCUMENTS

| | | | |
|---|---|---|---|
| 4,860,038 A * | 8/1989 | Thatcher et al. ............... 348/81 |
| 5,189,518 A * | 2/1993 | Nishida ................... 348/208.11 |
| 5,668,593 A * | 9/1997 | Lareau et al. ................ 348/146 |
| 5,721,585 A | 2/1998 | Keast et al. |
| 5,930,405 A * | 7/1999 | Chida ....................... 348/218.1 |
| 6,091,771 A | 7/2000 | Seeley et al. |
| 6,148,150 A * | 11/2000 | Yajima et al. .......... 348/208.99 |
| 2001/0040636 A1* | 11/2001 | Kato et al. ................... 348/220 |
| 2003/0165192 A1* | 9/2003 | Kitta ...................... 348/211.11 |
| 2004/0201713 A1* | 10/2004 | Matsui ..................... 348/218.1 |

FOREIGN PATENT DOCUMENTS

| | | |
|---|---|---|
| EP | 0 878 965 | 11/1998 |
| EP | 1 158 473 | 11/2001 |
| EP | 1 162 830 | 12/2001 |
| JP | 59039174 A * | 3/1984 |

* cited by examiner

*Primary Examiner*—Tuan Ho
*Assistant Examiner*—Jason Whipkey
(74) *Attorney, Agent, or Firm*—Frommer Lawrence & Haug LLP; William S. Frommer; Thomas F. Presson

(57) ABSTRACT

A camera includes a lens unit and an imaging unit. The optical axis of the camera is defined as a reference line, and a central line of a shooting area including an object to be shot is defined as an imaging centerline. A shift lens is moved to a shift-lens position which corresponds to the count of pulses supplied to a servomotor of a pan/tilter, so that an object image travels along an optical path generated by the shift lens is incident on another lens, and is then incident on the imaging unit. Accordingly, the object image incident on the imaging unit does not change while the shift lens is moved.

12 Claims, 14 Drawing Sheets

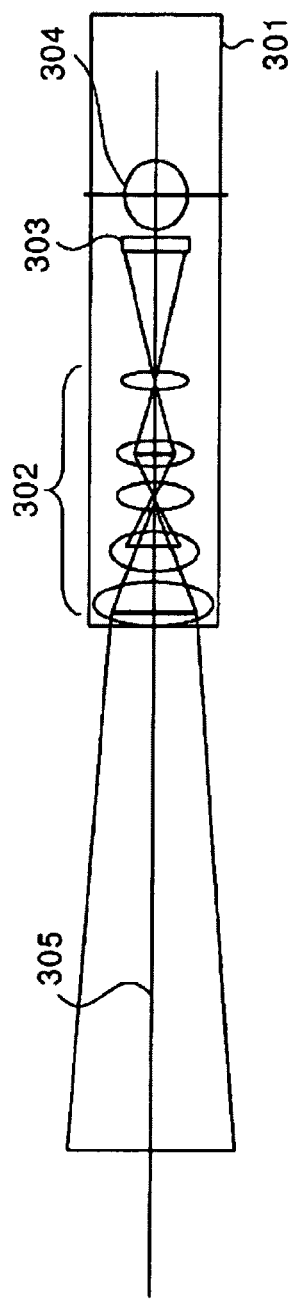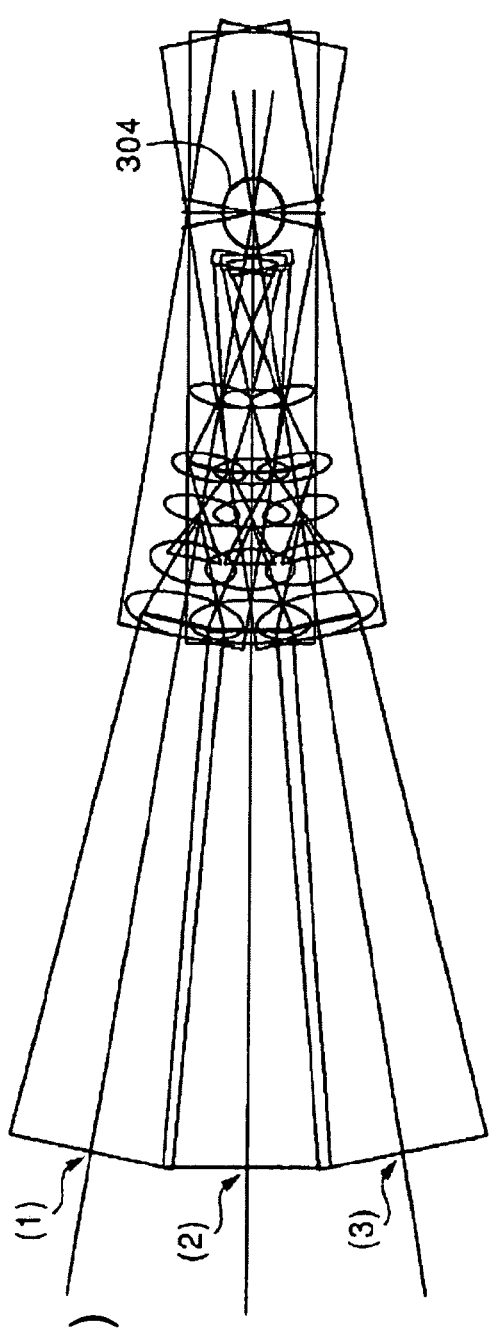
FIG. 14A (Related Art)
FIG. 14B (Related Art)

MONITORING SYSTEM, MONITORING METHOD, AND IMAGING APPARATUS

BACKGROUND OF THE INVENTION

1. Field of the Invention

The present invention relates to a monitoring system, a monitoring method, and an imaging apparatus used in a surveillance camera or the like.

2. Description of the Related Art

Generally, monitoring systems are used for surveillance over a wide area, for example, for sea surveillance, river surveillance, monitoring of restricted areas, observation of the behavior of wild animals, etc. In monitoring systems, video cameras having an extremely large number of pixels are used in order to shoot an image of a wide area. Accordingly, there is a problem in that the systems are expensive and high costs are incurred. In order to solve this problem, a method has been proposed in which many still images are shot while successively shifting a shooting area of a camera and an image of a monitored area is obtained by connecting the still images. In this case, an image having an extremely high resolution can be obtained as the overall image, and when an enlarged view of a part of the overall image is required, a clear, high-resolution image can be obtained as the enlarged view.

In the case of shooting still images while successively shifting the shooting area of the camera, it is necessary to prevent an imaging unit from moving while an object image is being acquired. More specifically, it is necessary to stop the imaging unit each time the object image is acquired.

As shown in FIG. 14A, a camera 301 includes a lens unit 302 and an imaging unit 303. The camera 301 is moved around the center of a reference circle 304 in the horizontal plane, and the optical axis of the camera 301 is defined as a reference line 305. The lens unit 302 includes a plurality of lenses.

As shown in FIG. 14B, the camera 301 is moved stepwise in the horizontal plane and still images are successively shot at positions indicated by (1), (2), and (3).

More specifically, a still image of an object at the position indicated by (1) is acquired by the imaging unit 303 while the movement of the camera 301 is stopped, and after the image is acquired, the camera 301 is moved to the next shooting area, that is, the shooting area at the position indicated by (2). When the camera 301 reaches the shooting area at the position indicated by (2), the movement of the camera 301 is stopped and a still image of an object at the position indicated by (2) is acquired by the imaging unit 303. After the image is acquired, the camera 301 is moved to the shooting area at the position indicated by (3). When the camera 301 reaches the shooting area at the position indicated by (3), the movement of the camera 301 is stopped and a still image of an object at the position indicated by (3) is acquired by the imaging unit 303. After the image is acquired, the camera 301 is moved to the next shooting area. The above-described processes are repeated to obtain many still images.

In this system, it is strongly required to reduce the time for shooting the still images. However, according to known techniques, in order to reduce the time cycle at which the still images are acquired, it is necessary to reduce the time for taking each still image and increase the moving speed of the camera.

When the time for taking each of the still images is reduced, that is, when a shutter speed is increased, although an image corresponding to an instantaneous angle of view can be obtained, sufficient amount of light cannot be obtained when the shutter speed exceeds a certain limit. When the amount of light is insufficient, only dark and dull images can be obtained.

In addition, when the moving speed of the camera is increased, the shutter speed must be necessarily increased, and the above-described problem occurs in that sufficient amount of light cannot be obtained when the speed exceeds a certain limit. In addition, since the camera must be quickly moved to a desired position and then be stopped, there is also a problem in that high-accuracy motors are necessary and high costs are incurred.

In addition, another method is known in which an optical path along which an object image travels is changed in accordance with the movement of the camera so that the object image incident on the imaging unit does not change even while the camera is being moved. In this case, the lens unit of the camera includes an optical-path changing element which changes the optical path. When the camera moves, the displacement of the camera is detected by an acceleration sensor or an angular-velocity sensor, and the optical-path changing element is controlled on the basis of the detected displacement so that the object image incident on the imaging unit does not change.

However, the acceleration sensor or the angular velocity sensor and a feedback circuit are necessary to control the optical-path changing element, and cumbersome design work is required.

SUMMARY OF THE INVENTION

Accordingly, an object of the present invention is to provide a monitoring system, a monitoring method, and an imaging apparatus in which an optical-path changing element can be controlled without using an acceleration sensor, an angular velocity sensor, and a feedback circuit.

In order to attain the above-described object, according to the present invention, a monitoring system includes an imaging unit for shooting an image; an optical-path changing element which changes an optical path from an object; a shooting-direction changing unit which includes a servomotor as a drive source and changes a shooting direction of the imaging unit; a storing unit which stores image data; a display unit; and a controller which stores an original image consisting of a plurality of still images shot in a plurality of shooting directions or a compressed image obtained by compressing the original image in the storing unit and displays an overall panoramic image generated from the original image or the compressed image on the display unit. When the still image of a desired area is shot, the optical-path changing element is moved on the basis of the number of pulses applied to the servomotor such that an object image incident on the imaging unit does not change.

In addition, according to another aspect of the present invention, a monitoring method includes the steps of shooting a plurality of still images in a plurality of shooting directions within a predetermined moving range in a maximum moving range of a shooting-direction changing unit which includes a servomotor as a drive source and changes a shooting direction of an imaging unit; storing an original image consisting of the plurality of still images or a compressed image obtained by compressing the original image; and displaying an overall panoramic image generated from the original image or the compressed image. When the still image of a desired area is shot, an optical-path changing element which changes an optical path from an object is moved on the basis of the number of pulses supplied to the servomotor such that an object image incident on the imaging unit does not change.

In addition, according to another aspect of the present invention, an imaging apparatus includes an imaging unit for shooting an image; an optical-path changing element which changes an optical path from an object; and a shooting-direction changing unit which includes a servomotor as a drive source and changes a shooting direction of the imaging unit. When the still image of a desired area is shot, the optical-path changing element is moved on the basis of the number of pulses applied to the servomotor such that the object image incident on the imaging unit does not change.

Thus, according to the present invention, the optical-path changing element, which can change the optical path from the object, is controlled on the basis of the number of pulses applied to the servomotor used for changing the shooting direction of the imaging unit, so that the object image incident on the imaging unit does not change.

According to the known art, a camera a shift lens included in a camera is operated by detecting the acceleration of a stepwise movement of the camera. However, according to the present invention, even when the camera is mounted on a moving member which moves at a constant speed, the shift lens can be operated in accordance with the movement of the moving member, and the object image incident on the imaging unit can be prevented from changing.

In addition, according to the present invention, since the shift lens can be moved in a direction opposite to the direction of movement of the camera, the object image can be incident on the imaging unit for a time enough to obtain a sufficient amount of light.

In addition, according to the present invention, the shift lens can be controlled in an open-loop circuit without using an acceleration sensor, an angular velocity sensor, and a feedback circuit, which are necessary in the known system.

BRIEF DESCRIPTION OF THE DRAWINGS

FIG. 14 is a schematic diagram showing the operation of a known camera block.

DESCRIPTION OF THE PREFERRED EMBODIMENTS

Figure 1:
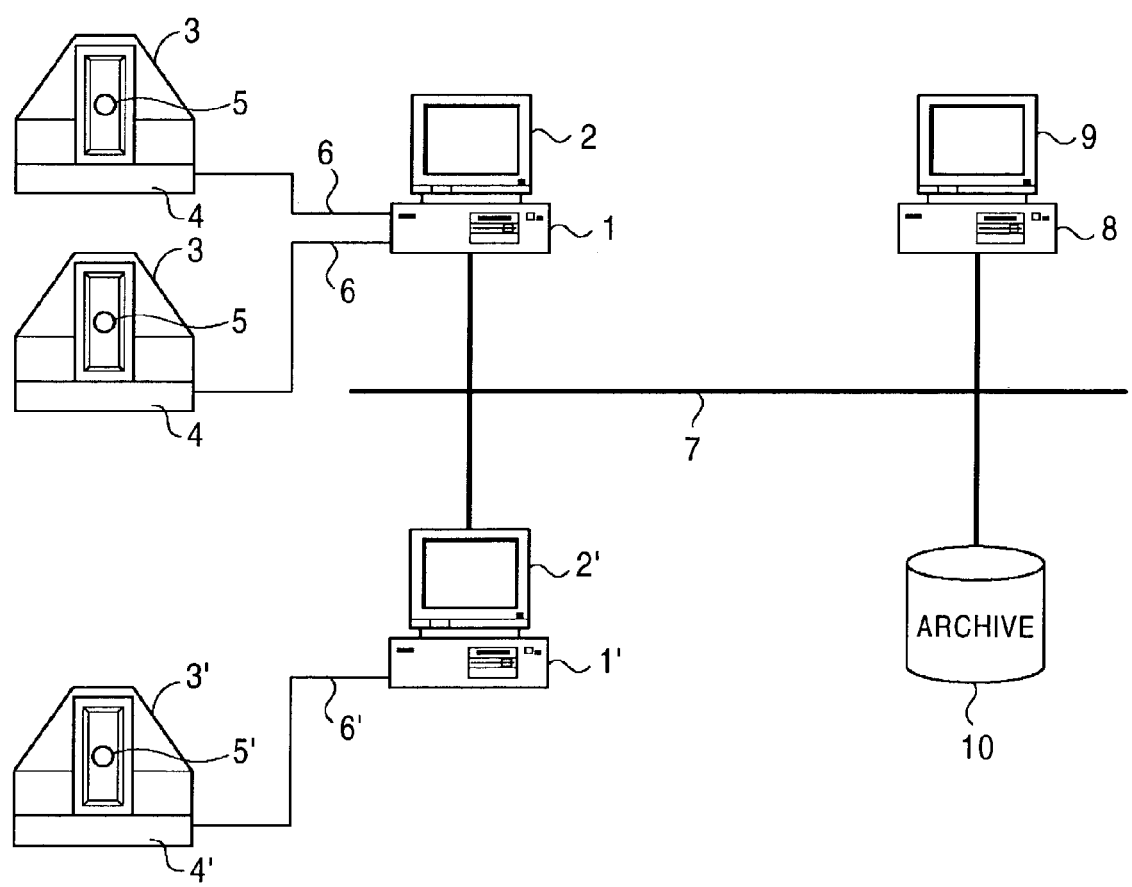
FIG. 1 is a schematic block diagram showing a monitoring system according to an embodiment of the present invention.

An embodiment of the present invention will be described below with reference to the accompanying drawings. FIG. 1 is a schematic diagram showing the construction of a monitoring system according to an embodiment of the present invention. A computer 1 is connected to a display 2 and controls camera units 3. In the example shown in FIG. 1, a single computer 1 controls two camera units 3, and another computer 1' is connected to another display 2' and controls other camera units 3'. A single computer can control a plurality of camera units 3.

Each of the camera units 3 includes a pan/tilter 4 and a camera 5 which are integral with each other. The camera units 3 are set such that they can shoot distant target areas. For example, the cameras 5 have telephoto lenses whose magnifications are 10×, 70×, etc., and can shoot areas which are several tens of meters to several kilometers away from them.

Each camera 5 is a digital still camera which can release a shutter in synchronization with an external trigger and includes an imaging device, such as a Charge Coupled Device (CCD), with Video Graphics Array (VGA) resolution (640 pixels×480 pixels), Extended Graphics Array (XGA) resolution (1024 pixels×768 pixels), or Super Extended Graphic Array (SXGA) resolution (1280 pixels× 1024 pixels). When an imaging device with VGA resolution is used, image data is output at 30 fps (frame per second). In addition, when an imaging device with XGA resolution is used, image data is output at 15 fps, and when an imaging device with SXGA resolution is used, image data is output at 7.5 fps.

The image data is transmitted from the camera units 3 to the computer 1 via buses 6. The buses 6 serve to transmit the image data and control signals for the camera units 3. The computer 1' and the camera units 3' have a construction similar to that described above.

The computers 1 and 1' store the image data obtained from the camera units 3 and 3', respectively, in memories, generate Graphical User Interfaces (GUIs) for operation, as will be described below, and control the camera units 3 and 3', respectively, so that images of desired target areas are provided to the user. The images obtained are compressed in accordance with a compression encoding format such as the Joint Photographic Experts Group (JPEG) format.

The computers 1 and 1' are connected to each other with a Local Area Network (LAN) 7, and another computer 8 is also connected to the LAN 7. Reference numeral 9 denotes a display of the computer 8. The computer 8 receives the image data, etc., from the computers 1 and 1' via the LAN 7, stores the image data in an archive 10, and processes the image data. For example, face recognition, baggage recognition, environment recognition, car recognition, etc., are performed by using the image data. A device which can store a large amount of data, such as a tape streamer, is used as the archive 10.

Figure 2:
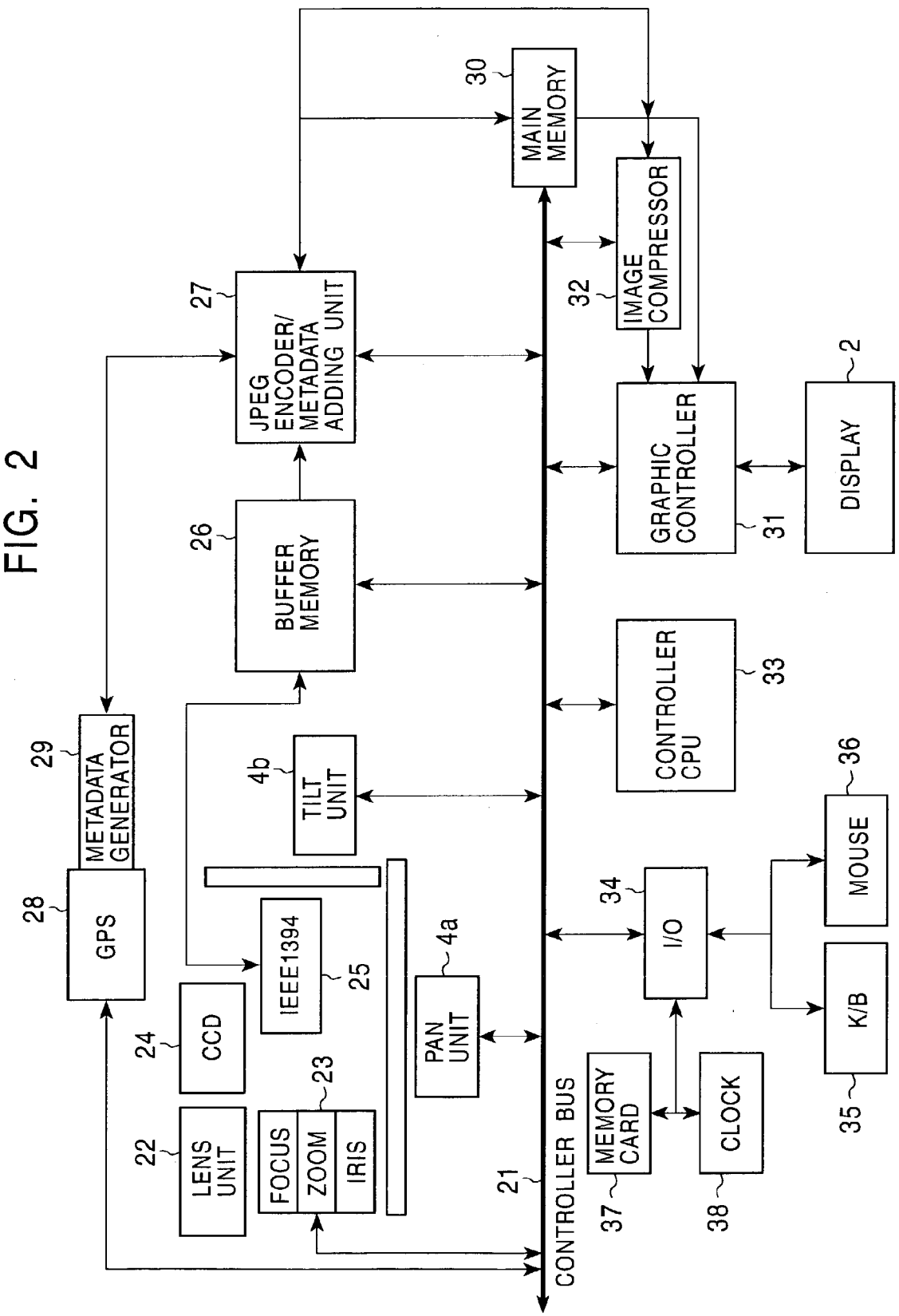
FIG. 2 is a block diagram showing the construction of a computer and a camera unit included in the monitoring system according to the embodiment of the present invention.

FIG. 2 is a diagram showing the detailed construction of the computer 1 and one of the camera units 3 included in the above-described monitoring system. In the example shown in FIG. 2, components of the camera unit 3 and the computer 1 are connected to a common controller bus 21.

The pan/tilter 4 includes a pan unit 4a and a tilt unit 4b. The pan unit 4a and the tilt unit 4b include servomotors as driving sources thereof, and respectively pan and tilt the camera 5 in accordance with control signals supplied from a controller Central Processing Unit (CPU) 33 via the controller bus 21. The camera 5 is disposed on the pan/tilter 4. In the present specification, to pan means to rotate the camera in the horizontal plane, and to tilt means to rotate the camera in the vertical plane. For example, the maximum pan angle is 180°, and the maximum tilt angle is 50°.

As will be described below, the camera 5 is moved at a constant speed within a range of, for example, the tilt angle=±15° and the pan angle=±50° in the maximum moving range. When the camera 5 reaches a position where the center of the shooting area can be acquired, the shutter is released and a still image (hereinafter sometimes referred to as "frame") is shot. M (for example, 8) frames in the vertical direction and N (for example, 16) frames in the horizontal direction, that is, M×N=8×6=128 frames in total, are successively shot and a single overall image is obtained by connecting and compressing these frames. Each frame is, for example, an XGA image (1024 pixels×768 pixels). Accordingly, if overlapping areas are ignored, the 128 frames correspond to an image having approximately a hundred million pixels (1024 pixels×16 frames=16,384 pixels in the horizontal direction and 768 pixels×8 frames=6,114 pixels in the vertical direction). It takes about five seconds to shoot 128 frames, and the sizes of the overlapping areas are 16 pixels in both the vertical and horizontal directions.

The camera 5 is a digital still camera, and includes a lens unit 22, a focus/zoom/iris control unit 23, and an imaging unit 24. The focus/zoom/iris control unit 23 is controlled by control signals supplied from the controller CPU 33 via the controller bus 21. The imaging unit 24 includes a solid-state imaging device, such as a CCD, and a camera-signal processing circuit. A digital image signal output form the imaging unit 24 is recorded in a buffer memory 26 via an interface 25 which complies with the Institute of Electrical and Electronics Engineers (IEEE) 1394 standard.

Data output from the buffer memory 26 is supplied to a JPEG encoder/metadata adding unit 27, where the image data is converted into JPEG data. Although JPEG is used as an example of a compression format, other compression formats may also be used. In addition, it is not always necessary to compress the data.

The camera unit 3 is provided with a Global Positioning System (GPS) 28 for detecting the location thereof. Since the GPS 28 is provided, data on the location of the camera can be recorded and the direction of the camera can be detected, so that directions of a plurality of cameras can be controlled in association with each other. The GPS 28 can be controlled by control signals supplied from the controller CPU 33 via the controller bus 21.

The output signal from the GPS 28 is supplied to a metadata generator 29, where location information (latitude, longitude, direction, altitude, etc.) based on the detection result obtained from the GPS 28 and metadata (time, parameters of the camera 5 (magnification, focus value, iris value, etc.)) are generated. The location information and the metadata are supplied to the JPEG encoder/metadata adding unit 27, and are added to the JPEG data.

The JPEG data with the location information and the metadata is stored in a main memory 30 such as a hard disk, and is supplied to a graphics controller 31 and an image compressor 32. In the present specification, to record means to store data in the main memory 30 and to playback means to read out data from the main memory 30. In addition, a mode in which a currently shot image is directly displayed before storing it in the main memory 30 is called "live mode" and a mode in which data which is already recorded in the main memory 30 is played back and displayed is called "view mode".

The main memory 30 functions as a server. When, for example, an XGA image is compressed with JPEG, the amount of data is reduced to about 100 kbyte per frame, that is, 12.5 Mbyte for 128 frames. Accordingly, if the main memory 30 has the capacity of about 80 Gbyte, it can store JPEG data obtained in one day. In the view mode, not only the data stored in the main memory 30 but also the older data stored in a storage device such as the archive can be played back.

The JPEG data read out from the main memory 30 is supplied to the graphics controller 31. The image compressor 32 generates a compressed image or a thumbnail from the JPEG data obtained from the JPEG encoder/metadata adding unit 27 or from the JPEG data read out from the main memory 30. For example, the overall panoramic image can be obtained by eliminating vertical and horizontal lines. In addition, a compression process for forming a moving-range image, which will be described below, is also performed in the image compressor 32. In the case of an XGA image, data of a hundred million pixels is subjected to the JPEG compression and the process performed by the image compressor 32, so that the overall panoramic image (for example, 400 pixels×1000 pixels) is obtained. The moving-range image is also a thumbnail, but is rougher than the overall image.

The graphics controller 31 converts the JPEG data into bitmap data, and performs a graphical process so as to show a desired image on the display 2. More specifically, the moving-range image, the overall image, a selected image, GUI images such as buttons, etc., are shown on the display 2. Details will be described below.

The graphics controller 31 performs image processing and detects an image change, that is, a change in the image compared to a reference image. For example, in the view mode, the image change is detected by comparing a currently shown image with a reference image which is stored beforehand. An image obtained at a predetermined time of the previous day, for example, is set as the reference image, and the difference in pixel component value between the reference image and the image obtained afterwards is determined. If the absolute value of the difference in pixel component value exceeds a predetermined value, it is determined that a change has occurred. The difference in pixel component value is calculated between, for example, each of the pixels in a certain frame of the reference image and a pixel at the same position in the corresponding frame of the compared obtained for each of the frames. Instead of calculating the difference in pixel component value for all of the pixels, the difference in pixel component value may be calculated only at representative pixels or selected pixels. In addition, when a color is specified, an image change can be detected on the basis of a change in objects of the specified color.

When a change is detected, the display 2 shows an alarm screen in which, for example, the frame at which the change is detected is distinguished from the other frames. More specifically, the alarmed frame may be shown with different brightness, different color, blinking lights, etc. The reference image can be arbitrarily selected from among the stored images.

As described above, the controller CPU 33 connected to the controller bus 21 performs lens control (for example, focus control), exposure control (for example, aperture control, gain control, and electric shutter speed control), white balance control, image quality control, etc., of the camera 5, and also controls the pan unit 4a and the tilt unit 4b.

Reference numeral 34 denotes an I/O port. The I/O port 34 is connected to a keyboard 35 and a mouse 36. In addition, the I/O port 34 is also connected to a memory card 37 and a clock 38. The JPEG data with the location information and the metadata stored in the main memory 30 can be recorded in the memory card 37, and time data can be obtained from the clock 38.

Although each component is connected to the controller bus 21 in FIG. 2, the camera unit 3 and the computer 1 may also be placed at separate positions and be connected to each other with an IEEE 1394 cable or with a Universal Serial Bus (USB). In such a case, an optical fiber is used as a physical transmission path. When the optical fiber is used, the camera unit 3 may be separated from the computer 1 for controlling it by several hundred meters to several kilometers. Alternatively, the camera unit 3 and the computer 1 may also be connected to each other with a wireless LAN.

Figure 3:
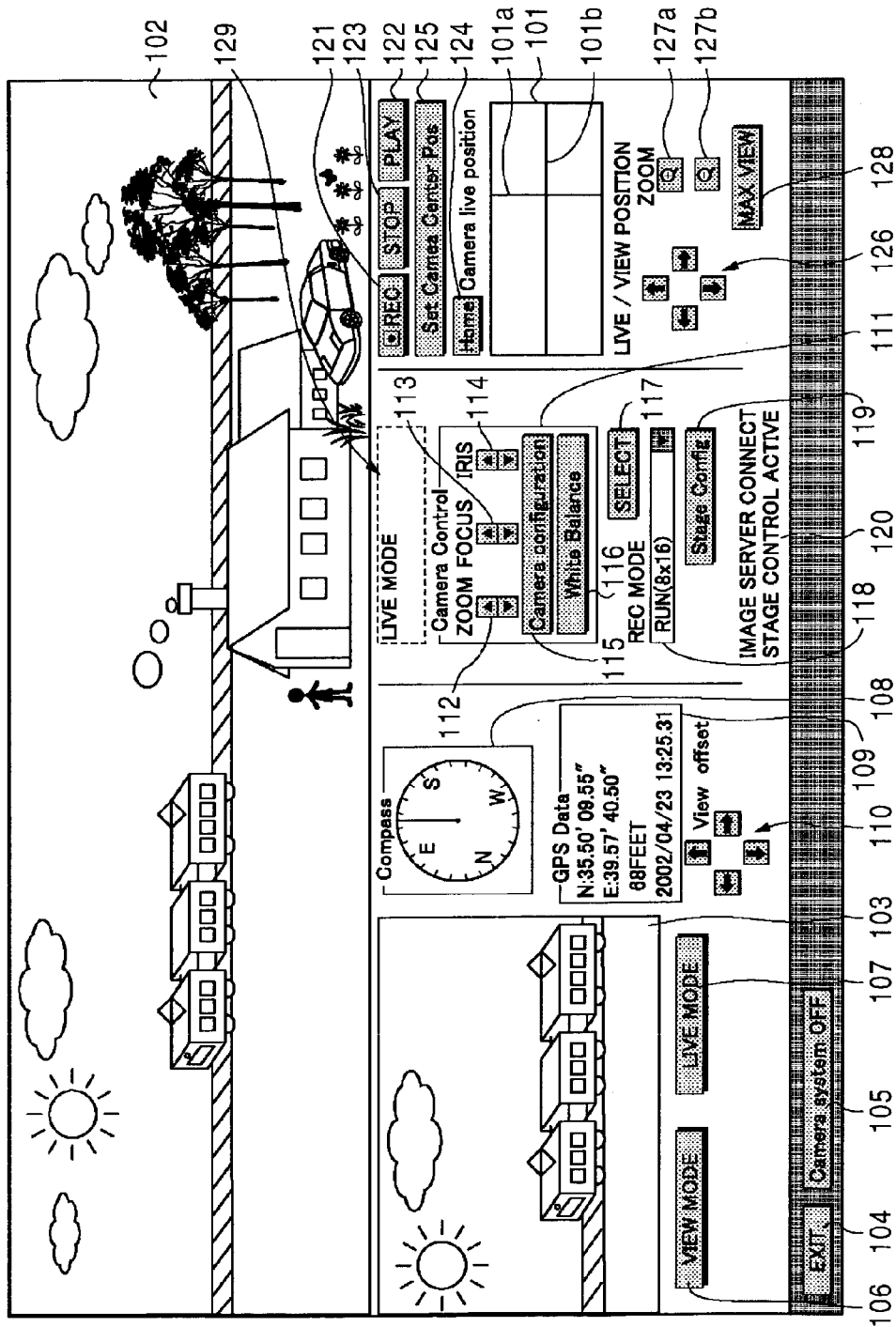
FIG. 3 is a schematic diagram showing an example of a display screen according to the embodiment of the present invention.

FIG. 3 is a diagram showing an example of a GUI screen according to the embodiment of the present invention. In the following descriptions, display sections, operating buttons, display regions, etc., shown on the GUI screen according to the embodiment of the present invention will be explained with reference to FIG. 3. The screen includes a moving-range image display section 101, an overall-image display section 102, and a selected-image display section 103.

The moving-range image display section 101 shows a moving-range image, which is an image of the maximum shooting range of the camera unit 3 and is constructed of a plurality of frames. As described above, the maximum pan angle is 180° and the maximum tilt angle is 50°, and the moving-range image is generated by using the frames shot in the maximum moving range. For example, the camera unit 3 is set and the camera 5 is moved over the maximum moving range, and a thumbnail obtained by eliminating vertical and horizontal lines from an image including a plurality of frames shot by the camera 5 is used as the moving-range image.

In the moving-range image display section 101, a camera live position, which corresponds to the current direction of the lens center of the camera unit 3, is indicated by the intersection of a line 101a and a line 101b. A desired position in the moving-range image can be specified by moving the lines 101a and 101b, and the shooting direction can be changed to a direction corresponding to the specified position. Then, the specified position is set as the center or a home position, and M×N frames are shot within a predetermined moving range, and are stored or displayed. In addition to the lines 101a and 101b, a pointer, for example, the mouse 36, may also be used for specifying an arbitrary position in the display screen shown in the moving-range image display section 101, and the camera unit 3 may be controlled such that the lens center of the camera unit 3 faces toward the specified position.

The overall-image display section 102 shows the overall panoramic image which is obtained by compressing the JPEG data corresponding to the original image by the image compressor 32. Monitoring is performed by observing the overall image displayed. In addition, as described above, when an image change is detected, an alarm screen is shown in which the frame at which the change is detected is distinguished from the other frames in the overall image displayed in the overall-image display section 102.

The selected-image display section 103 shows a selected image, which is an enlarged view of a part of the overall image. The image can be enlarged by showing the original image of a single frame which is not compressed. In addition, the image can also be enlarged by digital signal processing.

An "EXIT" button 104 is used for turning off the power of the monitoring system, and a "Camera system OFF" button 105 is used for turning off the power of the camera unit 3.

In addition, a "VIEW MODE" button 106 is used for switching the mode of the monitoring system to the view mode. The view mode is the mode in which the overall image and the partial image are displayed on the basis of the image data stored in the main memory 30 or other servers.

In addition, a "LIVE MODE" button 107 is used for switching the mode of the monitoring system to the live mode. The live mode is the mode in which the overall image and the partial image are displayed on the basis of the frame which is currently shot by the camera unit 3.

A compass display section 108 shows a compass which indicates the direction of the lens center of the camera 5, and a GPS data display section 109 shows the latitude, longitude, and altitude of the location where the camera unit 3 is placed and the time and date of shooting. The data shown in these sections 108 and 109 are obtained by the GPS 28 included in the camera unit 3.

A "View offset" buttons 110 are used for adjusting the position of the selected frame. More specifically, the "View offset" button 110 is used for moving a frame, which is selected by the pointer in the overall image shown in the overall-image display section 102, in the upward, downward, leftward, and right ward directions. In the overall image, the adjacent frames overlap each other by a predetermined number of pixels, for example, 16 pixels. Since the frame can be moved within an area including the overlapping areas, the adjacent frames can be smoothly connected with good continuity.

A mode display section 129 is used for displaying mode information, alarm information, error information, etc. The mode information is used for informing the user of the mode, that is, the live mode or the view mode, of the monitoring system. The alarm information is used for warning the user when, for example, the frame moved by the above-described "View offset" button 110 reaches the limit of the movable range thereof. The error information is used for informing the user of an error when it occurs in the monitoring system.

A camera control section 111 includes a "ZOOM" button 112, a "FOCUS" button 113, an "IRIS" button 114, a "Camera configuration" button 115, and a "White Balance" button 116. The "ZOOM" button 112 is used for adjusting the zoom of the camera unit 3, the "FOCUS" button 113 is used for adjusting the focus of the camera unit 3, and the "IRIS" button 114 is used for adjusting the iris of the camera unit 3. In addition, the "Camera configuration" button 115 is used for adjusting the γ-characteristic, the shutter speed, the gain characteristic, etc., of the camera unit 3, and the "White Balance" button 116 is used for adjusting the white balance of the camera unit 3. The display the camera control section 111 may be omitted when the monitoring system is operated in the view mode.

A "SELECT" button 117 is used for displaying a select screen in the view mode. The select screen is used for selecting an area to be played back or recorded from among the frames included in the overall image.

Figure 4:
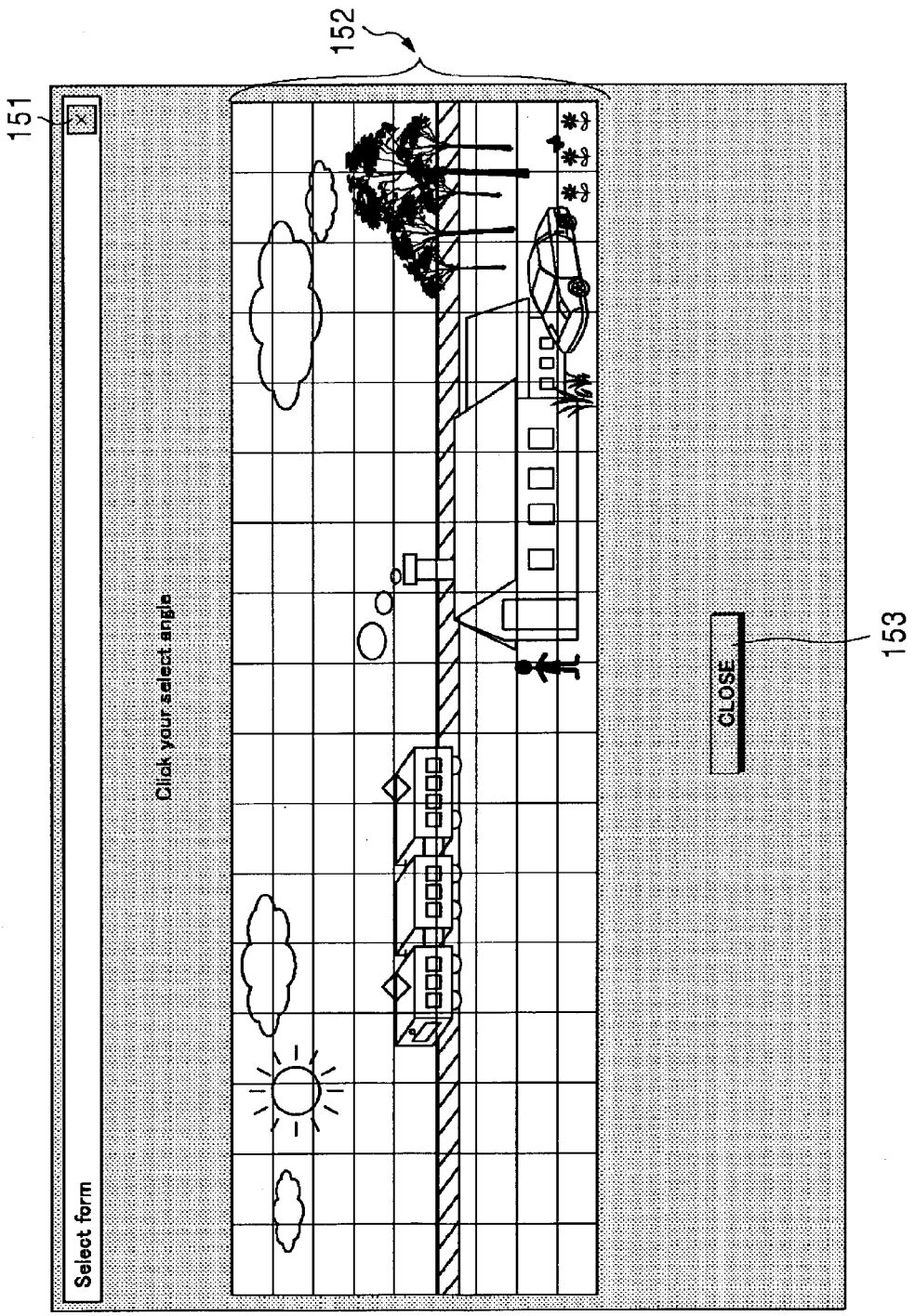
FIG. 4 is a schematic diagram showing an example of a select screen according to the embodiment of the present invention.

FIG. 4 shows an example of a select screen. As shown in FIG. 4, the select screen includes a close button 151, an image display section 152, and another close button 153. The close buttons 151 and 153 are clicked when the select screen is to be closed. The image display section 152 shows the overall image which the same as that shown in the overall-image display section 102 along with lines which divide the overall image into the frames included therein. Alternatively, the image display section 152 may show the frames included in the overall image shown in the overall-image display section 102 such that they are separated from each other, or a matrix pattern may be shown so as to overlap the overall image. In the image display section 152, when an arbitrary position in a desired image is designated by a pointer, the frame at that position is selected, and brightness, resolution, contrast, etc., of the designated frame is changed so as to show that that frame is selected.

A REC mode selection menu 118 is a pull-down menu used for selecting a recording mode. This pull-down menu shows a list of recording modes corresponding to combinations of image sizes and recording methods (RUN and SINGLE). The image size can be selected from among the overall image including 8×16 frames, a partial image including 4×8 frames extracted from the overall image, and a partial image including 2×4 frames extracted from the overall image. The partial images can be selected by using the selection screen. With regard to the recording methods, "RUN" is the method in which the image obtained is recorded at a predetermined cycle (for example, at 5 sec cycle), and "SINGLE" is the method in which the image obtained is recorded only once. Thus, the recording modes are selected from among the combinations of the image sizes and the recording methods.

A "Stage Config." (Stage Configuration) button 119 is used for finely adjusting the precision at which the stage is moved. A message area 120 shows the connection state between the computer 1 for control and the camera unit 3 and the control state of the stage of the camera unit 3. When the computer 1 for control and the camera unit 3 are connected to each other, a message "IMAGE SERVER CONNECT" is shown in the message area 120. In addition, when the camera unit 3 is in a state such that it can be controlled, a message "STAGE CONTROL ACTIVE" is shown in the message area 120.

A "REC" button 121 is used to start recording the image, and when this button is selected by the pointer, recording is started in accordance with the recording mode selected in the REC mode selection menu 118. More specifically, the recording is started in accordance with the recording mode selected from among RUN (8×16), RUN (4×8), RUN (2×4), SELECT SINGLE RUN (8×16), SELECT SINGLE RUN (4×8), and SELECT SINGLE RUN (2×4).

A "PLAY" button 122 is a button used for playing back the image data stored in the server (the main memory 30).

More specifically, when the "PLAY" button 122 is selected by the pointer, a recorded-data display screen is shown. The recorded-data display screen shows the information used for identifying the stored image data. This information is based on information included in a direction file, which will be described below.

Figure 5:
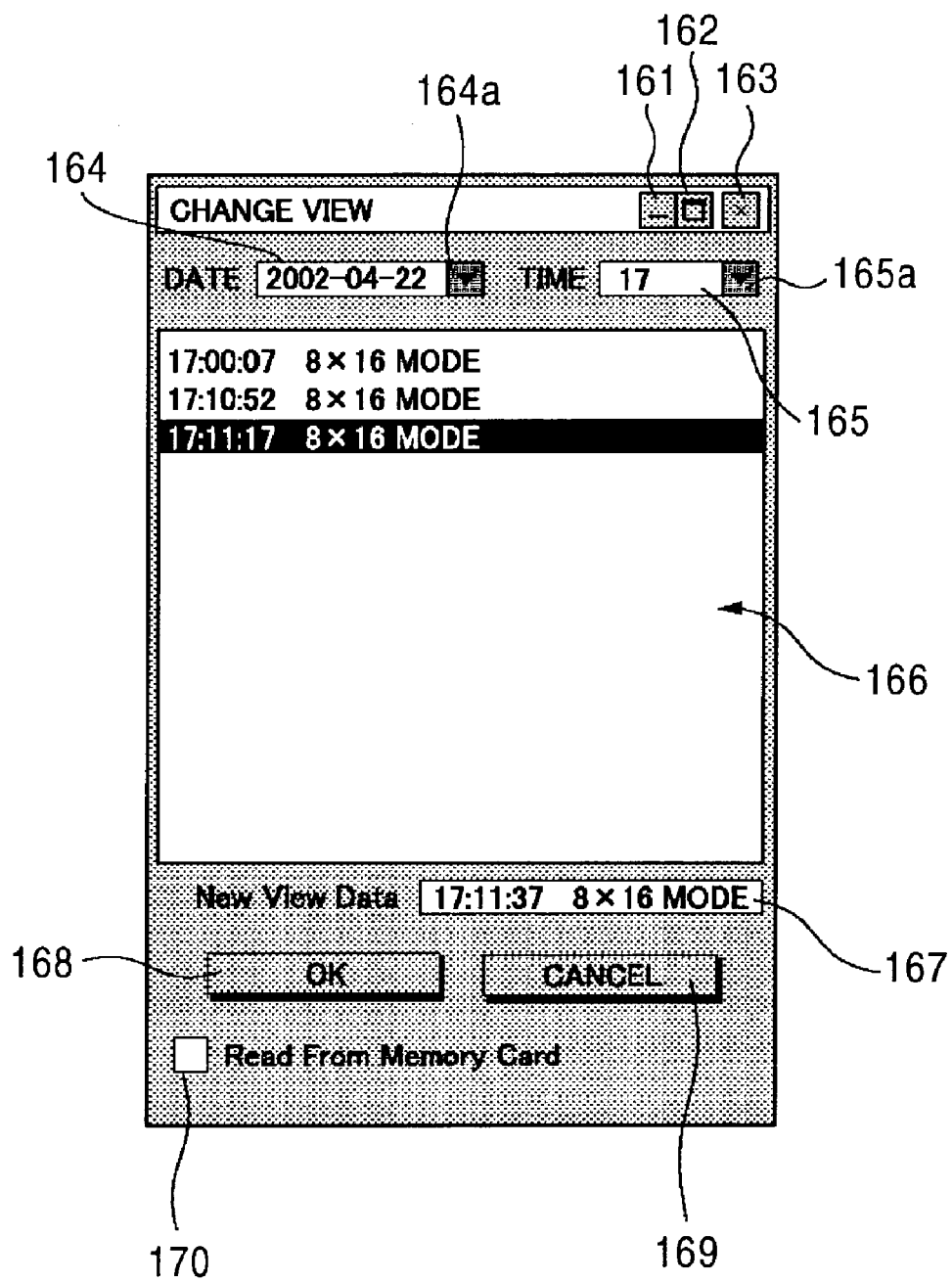
FIG. 5 is a schematic diagram showing an example of a recorded-data display screen according to the embodiment of the present invention.

FIG. 5 shows an example of the recorded-data display screen. As shown in FIG. 5, the recorded-data display screen includes a minimize button 161, a maximize button 162, a close button 163, a date designation section 164, a time designation section 165, a recorded-data display section 166, a latest-recorded-data display section 167, an "OK" button 168, a "CANCEL" button 169, and a storage-unit-change check button 170.

The minimize button 161 is used for minimizing the recorded-data display screen into, for example, an icon, and the maximize button 162 is used for maximizing the recorded-data display screen and displaying it in the entire display area of the monitor. The close button 163 is clicked when the recorded-data display screen is to be closed.

The date designation section 164 is used for designating the recording date of the data which the user wishes to display in the overall-image display section 102. For example, a list of recording dates of the data which can be displayed may be shown in a pull-down menu when a button 164a at the right end of the date designation section 164 is clicked, and the user may select a date from among the dates displayed.

The time designation section 165 is used for designating the recording time of the data which the user wishes to display in the overall-image display section 102. For example, a list of recording times of the data which can be displayed may be shown in a pull-down menu when a button 165a at the right end of the time designation section 165 is clicked, and the user may select a date from among the dates displayed.

The recorded-data display section 166 shows the list of data corresponding to the date and the time designated by the date designation section 164 and the time designation section 165, respectively, from among the data stored in the storage device. The latest-recorded-data display section 167 shows the latest recorded data from among the data stored in the storage device. Alternatively, the latest-recorded-data display section 167 may also show the latest recorded data from among the data corresponding to the data and the time designated by the date designation section 164 and the time designation section 165, respectively.

The "OK" button 168 is clicked when the desired recorded data is designated, and the "CANCEL" button 169 is clicked when the recorded-data display screen is to be closed. The storage-unit-change check button 170 is checked when the storage unit from which the recorded data is read out is to be changed from the storage device to a detachable semiconductor memory card.

With reference to FIG. 3 again, a "STOP" button 123 is used for stopping the recording operation or the playback operation. The "STOP" button 123 may be displayed when the "REC" button 121 or the "PLAY" button 122 is selected by the pointer.

A "Set Camera Center POS" (Set Camera Center Position) button 125 is used for setting the current direction of the camera to the center of the image including 8×16 frames.

A "Home" button 124 is used for controlling the camera unit 3 such that the lens center of the camera unit 3 returns to a home position. The home position is the position where the camera faces the left end. A "LIVE/VIEW POSITION" button 126 is used for panning or tilting the camera.

"ZOOM" buttons 127a and 127b are used for enlarging and reducing the selected image shown in the selected-image display section 103, and a "MAX VIEW" button 128 is used for showing the enlarged version of the selected image in another screen, for example, in the overall-image display section 102.

Figure 6:
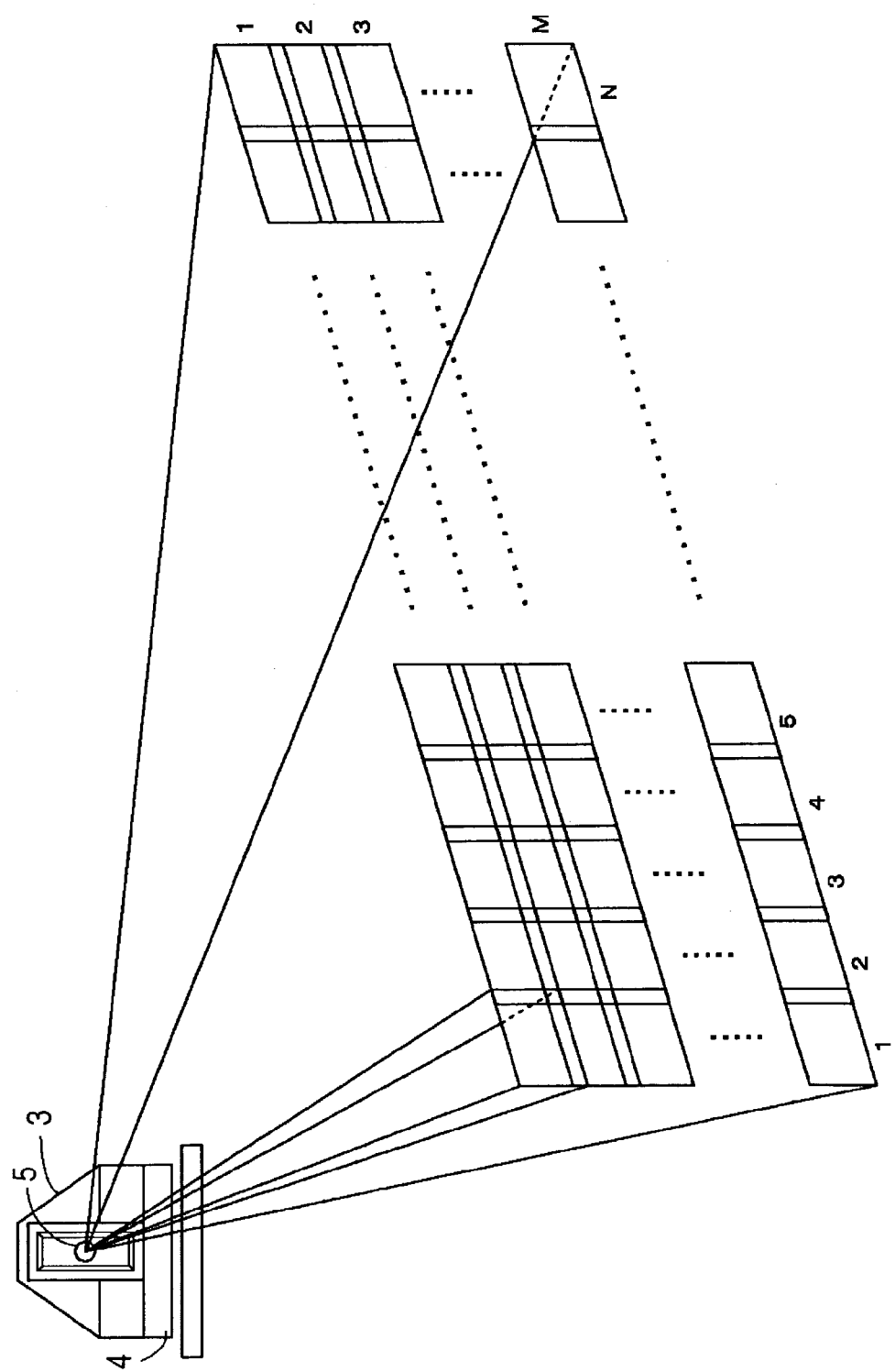
FIG. 6 is a schematic diagram showing a shooting operation and an image-acquiring operation according to the embodiment of the present invention.

Next, an example of a method for generating the overall image according to the embodiment of the present invention will be described below with reference to FIG. 6. As shown in FIG. 6, in the camera unit 3, the camera 5 is placed on a platform of the pan/tilter 4, and the shooting direction is changed from the home position. With reference to FIG. 6, when the M×N frames are viewed from the direction opposite to the camera, rows of frames are numbered 1, 2, ..., M from the top and lines of frames are numbered 1, 2, ..., N from the left. The home position corresponds to, for example, the frame at the coordinate position (1, 1).

After the frame at the coordinate position (1, 1) is shot, the camera unit 3 is tilted downward and the frame at the coordinate position (2, 1) is shot. Then, the frames at the coordinate positions (3, 1), ..., (M, 1), are shot successively, and then the frame at the coordinate position (1, 2), that is, the top frame in the second line, is shot. Similarly, the frames are successively shot until the frame at the coordinate position (M, N) is shot. As described above, each frame overlaps the adjacent frames by 16 pixels. In addition, each frame is compressed with JPEG and is stored in the main memory 30.

As described above, in the case in which each frame is an XGA image (1024 pixels×768 pixels), if the overlapping areas are ignored, an image including 128 frames has approximately a hundred million pixels (1024 pixels×16 frames=16,384 pixels in the horizontal direction and 768 pixels×8 frames=6,114 pixels in the vertical direction). The above-described overall-image display section 102 shows a compressed image or a thumbnail image generated from this image, and the selected-image display section 103 shows, for example, an XGA image of a single frame. Accordingly, the selected-image display section 103 shows an image having an extremely high resolution, and even when the overall image is unclear, a clear image can be displayed as the selected image.

Figure 7:
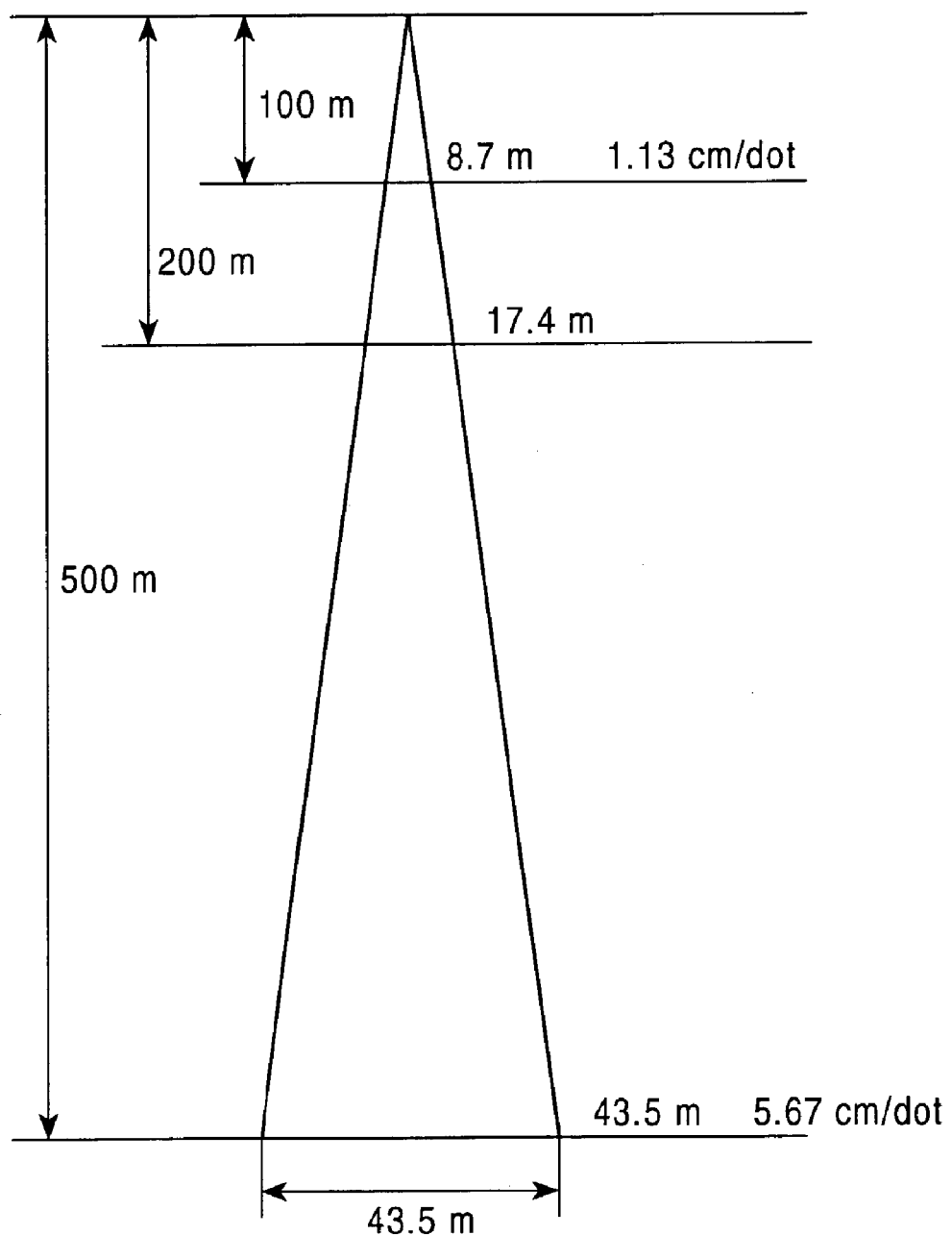
FIG. 7 is a schematic diagram showing a distance to an object, a shooting area, and a resolution according to the embodiment of the present invention.

FIG. 7 shows an area which can be covered by a single frame when a telephoto lens with a magnification of 75× is included in the camera unit 3. When an object which is 100 m away from the camera unit 3 is shot, an area 8.7 m high by 11.7 m wide is covered by a single frame. When, for example, an imaging device with XGA resolution is used in the camera 5, an area 1.13 cm high by 1.14 cm wide is covered by a single pixel.

When an object which is 200 m away from the camera unit 3 is shot, an area 17.4 m high by 23.4 m wide is covered by a single frame. When the imaging device with XGA resolution is used in the camera 5, an area 2.27 cm high by 2.29 cm wide is covered by a single pixel.

When an object which is 500 m away from the camera unit 3 is shot, an area 43.5 m high by 58.5 m wide is covered by a single frame. When the imaging device with XGA resolution is used in the camera 5, an area 5.67 cm high by 5.71 cm wide is covered by a single pixel.

Figure 8A:
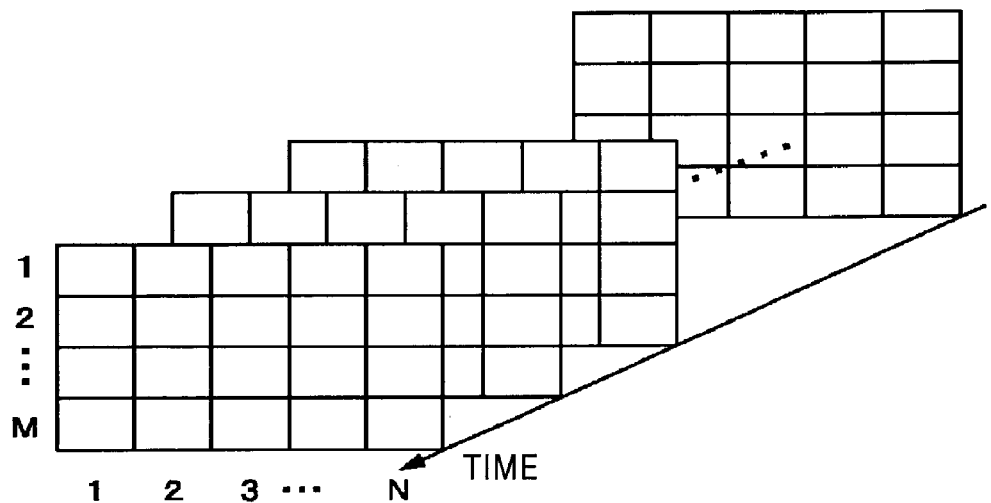
FIGS. 8A and 8B are schematic diagrams showing a management method of images obtained.

Next, a data management method used when the acquired image data is stored in the archive 10, the main memory 30, etc., will be described with reference to FIG. 8. As described above, the image including M×N frames is obtained at predetermined time intervals, and is compressed and stored. As shown in FIG. 8A, the position of each frame is defined in the M×N matrix. For example, a position address (1, 1) corresponds to the frame at the top frame in the line at the left end. Each frame has a file name including the position address and the time information which indicates the recording time. The time information includes year, month, date, hour, minute, and second. Accordingly, the file name of each fame is "year, month, date, hour, minute, second, and position address".

Figure 8B:
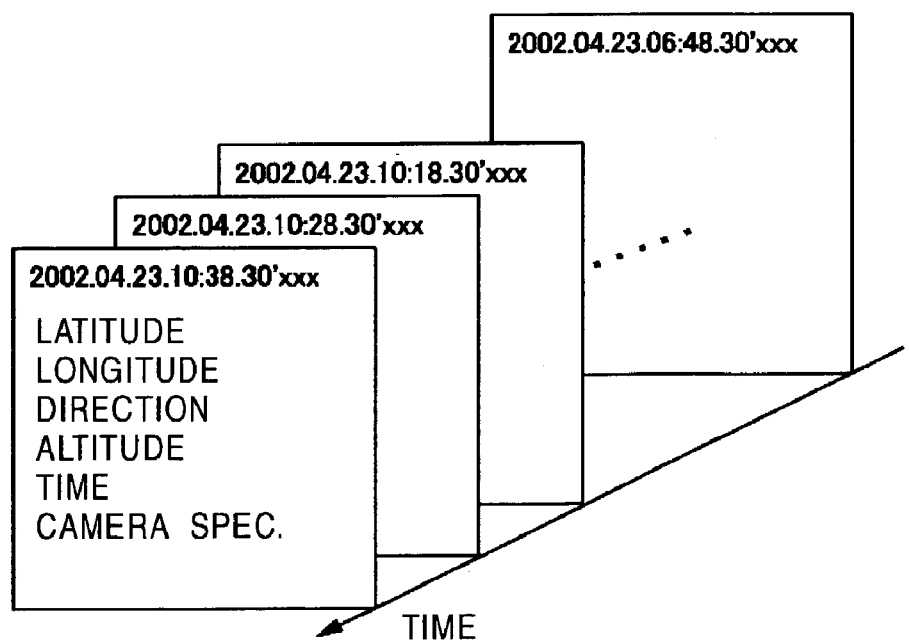

As shown in FIG. 8B, a direction file is provided for each of the overall images which each includes M×N frames. The direction file includes the same data as that included in the file name (year, month, date, hour, minute, second, and position address) of a file corresponding to the position address (1, 1), and thereby defines the group of M×N frames. In addition, the direction file includes the position information and the metadata for this group of frames. The position information and the metadata are generated by the metadata generator 29. More specifically, the direction file includes the location information (latitude, longitude, direction, altitude, etc.) and the metadata including the parameters of the camera 5 (magnification, focus value, iris value, etc.).

Figure 9A:
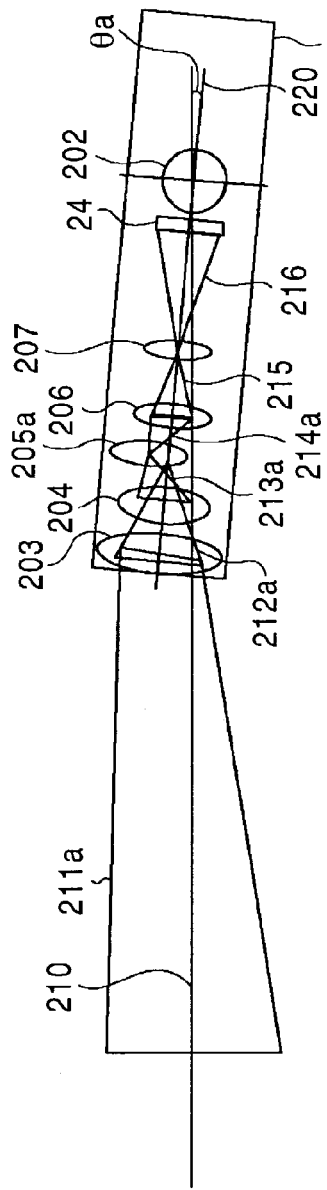
FIGS. 9A to 9C are schematic diagrams showing the operation of a camera block according the embodiment of the present invention.
Figure 9B:
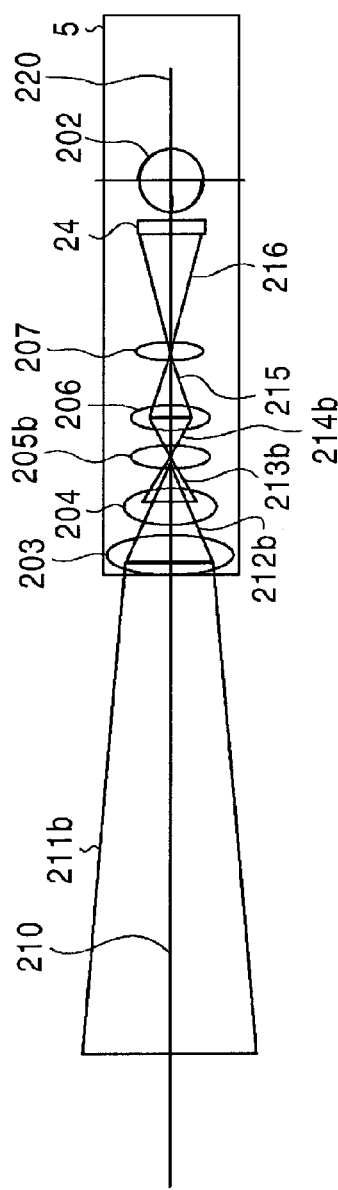
Figure 9C:
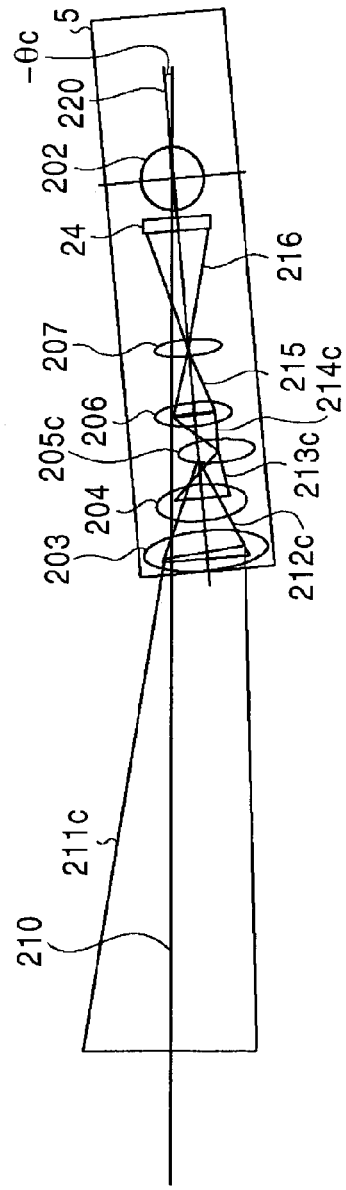

Next, the operation of the camera unit 3 according to the embodiment of the present invention will be described below with reference to FIGS. 9A to 9C. FIGS. 9A to 9C are sectional plan views of the camera 5 when the camera unit 3 is viewed from the top. In order to facilitate the explanation, a case in which the camera 5 is only panned is considered.

The camera 5 includes the lens unit 22 and the imaging unit 24. The center of the pan movement of the camera 5 is the center of a reference circle 202, and the optical axis of the camera 5 is defined as a reference line 220. A central line of a shooting area including an object to be shot is defined as an imaging centerline 210. The lens unit 22 includes lenses 203, 204, 206, and 207 and a shift lens (optical-path changing element) 205. The lens 203, 204, and 206 are, for example, convex lenses whose refractive indexes are greater than 1, and the shift lens 205 and the lens 207 are, for example, convex lenses whose refractive indexes are less than 1.

The shift lens 205 may be constructed of, for example, a lens, a linear motor which moves the lens in the horizontal plane, and a linear motor which moves the lens in the vertical plane. In the present invention, the lens itself is called a shift lens.

The camera 5 is panned in the order of, for example, FIGS. 9A, 9B, and 9C. First, as shown in FIG. 9A, the object image travels along an optical path 211a and is incident on the lens 203 when an angle between the reference line 220 and the imaging centerline 210 is θa.

The object image incident on the lens 203 is refracted at the refractive index of the lens 203, travels along an optical path 212a, and is incident on the lens 204. Then, the object image incident on the lens 204 is refracted at the refractive index of the lens 204, travels along an optical path 213a, and is incident on the shift lens 205, which is moved to a shift-lens position denoted by 205a.

The object image incident on the shift lens 205 is refracted at the refractive index of the shift lens 205, travels along an optical path 214a, and is incident on the lens 206. At this time, a voltage is applied to the linear motor of the shift lens 205 in accordance with the count of pulses supplied to the servomotor of the pan/tilter 4, and the shift lens 205 is moved to the shift-lens position 205a.

The object image incident on the lens 206 is refracted at the refractive index of the lens 206, travels along an optical path 215, and is incident on the lens 207. The object image incident on the lens 207 is refracted at the refractive index of the lens 207, travels along an optical path 216, and is incident on the imaging unit 24.

Accordingly, the shift lens 205 is moved to the shift-lens position 205a which corresponds to the count of pulses supplied to the servomotor of the pan/tilter 4, so that the object image travels along the optical path 214a generated by the shift lens 205, is incident on the lens 206, and is then incident on the imaging unit 24.

Next, as shown in FIG. 9B, the object image travels along an optical path 211b and is incident on the lens 203 when the reference line 220 coincides with the imaging centerline 210.

The object image incident on the lens 203 is refracted at the refractive index of the lens 203, travels along an optical path 212b, and is incident on the lens 204. Then, the object image incident on the lens 204 is refracted at the refractive index of the lens 204, travels along an optical path 213b, and is incident on the shift lens 205, which is moved to a shift-lens position denoted by 205b.

The object image incident on the shift lens 205 is refracted at the refractive index of the shift lens 205, travels along an optical path 214b, and is incident on the lens 206. At this time, a voltage is applied to the linear motor of the shift lens 205 such that the center of the shift lens 205, the reference line 220, and the imaging centerline 210 are aligned, and the shift lens 205 is moved to the shift-lens position 205b.

The object image incident on the lens 206 is refracted at the refractive index of the lens 206, travels along the optical path 215, and is incident on the lens 207. The object image incident on the lens 207 is refracted at the refractive index of the lens 207, travels along the optical path 216, and is incident on the imaging unit 24.

Accordingly, the shift lens 205 is moved to the shift-lens position 205b where the center of the shift lens 205, the reference line 220, and the imaging centerline 210 are aligned, so that the object image travels along the optical path 214b generated by the shift lens 205, is incident on the lens 206, and is then incident on the imaging unit 24.

Next, as shown in FIG. 9C, the object image travels along an optical path 211c and is incident on the lens 203 when an angle between the reference line 220 and the imaging centerline 210 is −θc.

The object image incident on the lens 203 is refracted at the refractive index of the lens 203, travels along an optical path 212c, and is incident on the lens 204. Then, the object image incident on the lens 204 is refracted at the refractive index of the lens 204, travels along an optical path 213c, and is incident on the shift lens 205, which is moved to a shift-lens position denoted by 205c.

The object image incident on the shift lens 205 is refracted at the refractive index of the shift lens 205, travels along an optical path 214c, and is incident on the lens 206. At this time, a voltage is applied to the linear motor of the shift lens 205 in accordance with the count of pulses supplied to the servomotor of the pan/tilter 4, and the shift lens 205 is moved to the shift-lens position 205c.

The object image incident on the lens 206 is refracted at the refractive index of the lens 206, travels along the optical path 215, and is incident on the lens 207. The object image incident on the lens 207 is refracted at the refractive index of the lens 207, travels along the optical path 216, and is incident on the imaging unit 24.

Accordingly, the shift lens 205 is moved to the shift-lens position 205c which corresponds to the count of pulses supplied to the servomotor of the pan/tilter 4, so that the object image travels along the optical path 214c generated by the shift lens 205, is incident on the lens 206, and is then incident on the imaging unit 24.

Accordingly, by moving the shift lens 205 in the direction opposite to the direction in which the camera 5 is moved as shown in FIGS. 9A to 9C, the object image exposed at the imaging unit 24 can be prevented from changing.

In the present embodiment, pulses necessary for moving the camera 5 by an amount corresponding to a single frame are called one-cycle pulses. In addition, there are two types of cycles in accordance with the direction of movement of the camera 5: FWD cycles and REV cycles. In the present embodiment, the position at which the shift lens 205 stands by before the FWD cycles is the shift-lens position 205a (see FIG. 9A).

During the FWD cycles, the shift lens 205 moves from the shift-lens position 205a to the shift-lens position 205c (see FIG. 9C). The servomotor for moving the camera 5 is controlled by, for example, time, and when a stepping motor is used as the motor for moving the camera 5, the number of pulses is counted and controlled.

During the REV cycles, the shift lens 205 is controlled in a manner opposite to the case of FWD cycles. When the camera 5 reaches the shift-lens position 205c and a single cycle is completed, a voltage applied to the linear motor for moving the shift lens 205 is immediately changed so that the shift lens 205 returns to the shift-lens position 205a.

When the shift lens 205 starts to move from the shift-lens position 205a to the shift-lens position 205c and reaches the shift-lens position 205b (see FIG. 9B), a shutter pulse is output to the imaging unit 24. The time at which the shutter pulse is output is determined on the basis of, for example, the drive voltage applied to the linear motor for moving the shift lens 205 in the horizontal plane.

In order to control the shift lens 205 such that the imaging unit 24 functions as if it is stationary, three parameters for moving the camera 5 must be controlled. The first parameter is the time necessary for the shift lens 205 to start moving from the shift-lens position 205a toward the shift-lens position 205c after a single cycle of the camera 5 is started. The second parameter is the time necessary for the camera 5 to move from the shift-lens position 205a to the shift-lens position 205c. The third parameter is the voltage applied to the linear motor when the shift lens 205 reaches the shift-lens position 205b. Generally, the three parameters are controlled such that the camera 5 and the shift lens 205 are moved at the same speed.

In addition, the amount of shift of the shift lens 205 is changed in accordance with the panning speed of the camera 5 and the amount of light necessary for acquiring an image.

In addition, with reference to FIGS. 9A, 9B, and 9C, the light paths 214a, 214b, and 214c are generated by the shift lens 205 which is moved to the shift-lens positions 205a, 205b, and 205c, respectively, the shift lens 205 being moved in accordance with the angle between the reference line 220 and the imaging centerline 210 so that the object image incident on the lens 206 does not change. When the angle between the reference line 220 and the imaging centerline 210 is determined, a voltage determined on the basis of the angle is applied to the linear motor for moving the shift lens 205 in the horizontal plane. Accordingly, the linear motor moves the shift lens 205 to a predetermined position, and an optical path 214 which guides the object image such that it the object image does not change while it is incident on the lens 206 is generated.

In addition, sine the camera 5 pans at a constant speed, the shift lens 205 may also be moved in accordance with the panning speed of the camera 5. For example, as shown in FIG. 10, the voltage applied to the linear motor for moving the shift lens 205 in the horizontal plane may be changed periodically in correspondence with the speed of the camera 5.

Figure 10:
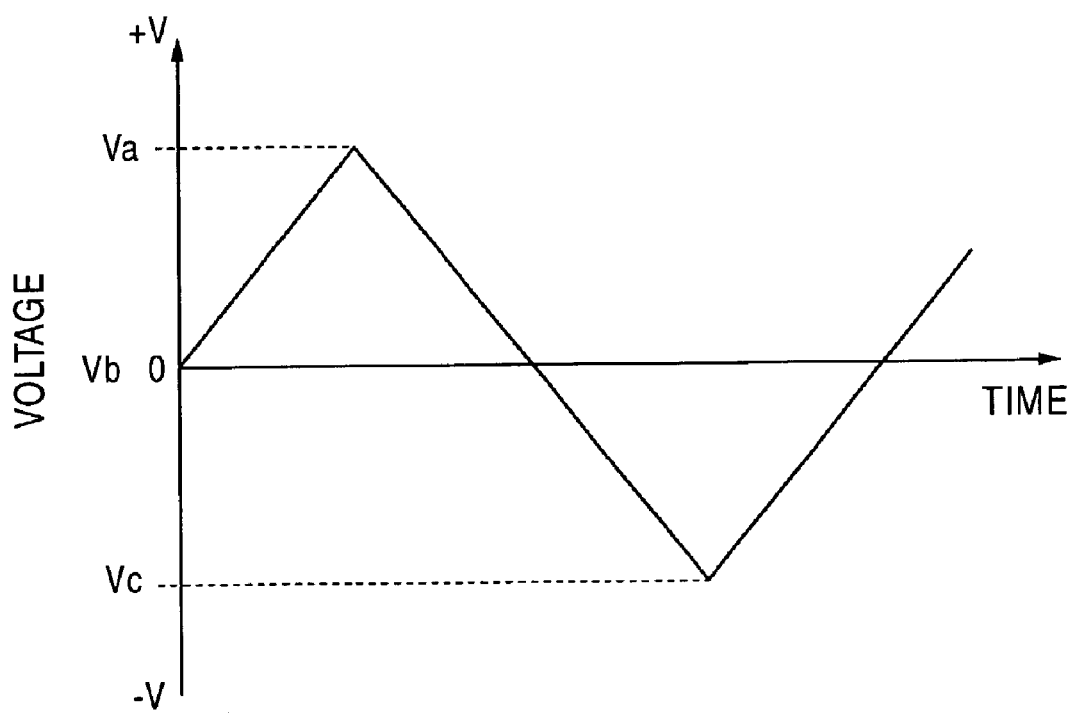
FIG. 10 is a graph showing the relationship between the time and the voltage applied to a shift lens according to the embodiment of the present invention.

When a voltage Va shown in FIG. 10 is applied to the linear motor for moving the shift lens 205 in the horizontal plane, the shift lens 205 is moved to the shift-lens position 205a. Similarly, when a voltage Vb is applied to the linear motor for moving the shift lens 205 in the horizontal plane, the shift lens 205 is moved to the shift-lens position 205b, and when a voltage Vc is applied to the linear motor for moving the shift lens 205 in the horizontal plane, the shift lens 205 is moved to the shift-lens position 205c.

In FIG. 10, the direction of the voltage corresponds to the direction of the horizontal displacement of the shift lens 205. Although the voltage Vb is 0 V in FIG. 10, the shift lens 205 may also be controlled in a case where the voltage Va is 0 V or the voltage Vc is 0 V.

Figure 11:
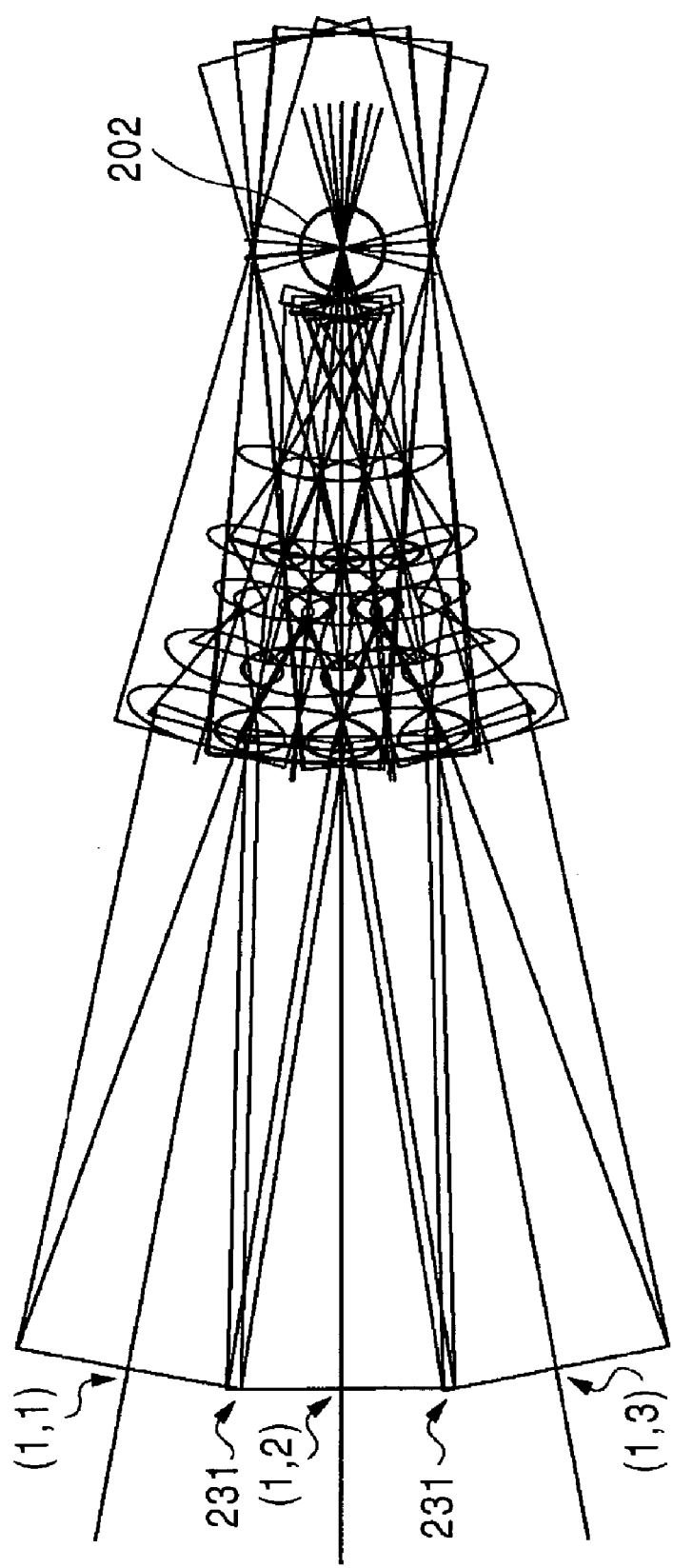
FIG. 11 is a schematic diagram showing the operation of the camera block according the embodiment of the present invention.

FIG. 11 shows a schematic diagram showing a case in which three areas are shot while moving the camera 5. In FIG. 11, three successive frames at coordinate positions of (1, 1), (1, 2) and (1, 3), for example, are successively acquired.

As shown in FIG. 11, the object image incident on the imaging unit 24 does not change while the optical path is at a position between the optical path 211a obtained when the camera 5 is at a position shown in FIG. 9A and the optical path 211c obtained when the camera 5 is at a position shown in FIG. 9C. Accordingly, the frames can be acquired at any time as long as the object image incident on imaging unit 24 does not change.

The camera 5 rotates around the center of the reference circle 202. The frames at the coordinate positions (1, 1), (1, 2), and (1, 3) are successively acquired while the camera 5 is panned at a constant speed. For this purpose, the shift lens 205 is moved, for example, from the shift-lens position 205a to the shift-lens position 205c, in accordance with the rotating direction of the camera 5. The movement of the shift lens 205 from the shift-lens position 205a to the shift-lens position 205c is performed every time a single frame is acquired. Accordingly, the object image incident on the imaging unit 24 does not change.

The sizes of the overlapping areas denoted by reference numeral 231 are, for example, 16 pixels in both the vertical and horizontal planes as described above. Accordingly, the size of the overlapping area between the two adjacent frames is 8 pixels.

The linear motor for moving the shift lens 205 cannot be driven completely linearly when the applied voltage is around Va and/or Vc. Accordingly, the frames are preferably acquired at a voltage around Vb where the linear motor can be driven completely linearly, so that a stable image can be obtained.

While the object image is incident on the imaging unit 24 and exposure is performed, the linear motor for moving the of the shift lens 205 must be driven completely linearly. Since the operation of the linear motor is not stable immediately after the linear motor has started, the exposure must not be started for a predetermined time before the operation of the linear motor becomes stable. Accordingly, a stable image can be obtained by acquiring the frames when the voltage applied is around Vb, that is, when the shift lens 205 is at a position around the shift-lens position 205b.

Figure 12A:
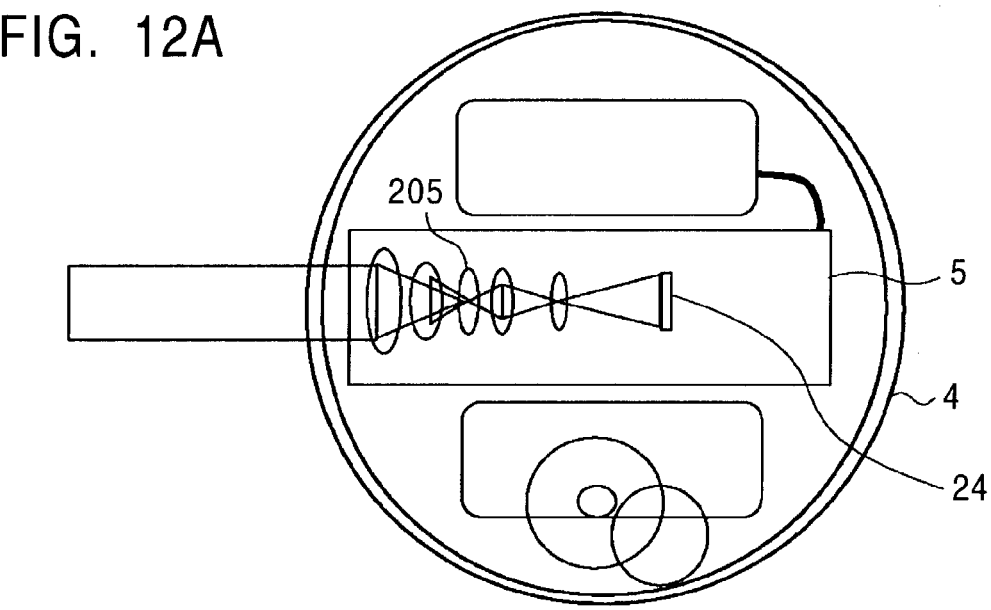
FIGS. 12A and 12B are schematic diagrams showing the operation of the camera block according the embodiment of the present invention.
Figure 12B:
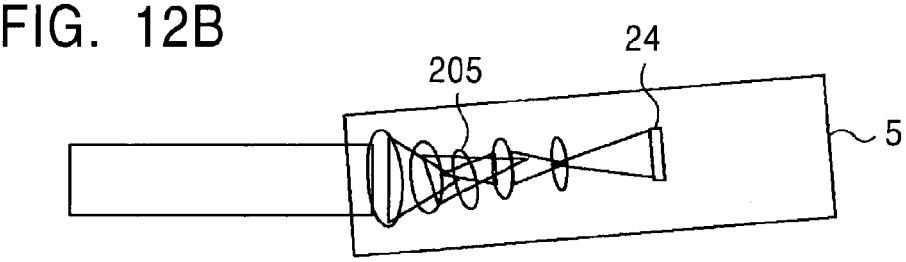

FIG. 12A is a sectional plan view of the pan/tilter 4 and the camera 5, and FIG. 12B is a sectional side view of the camera 5. As shown in FIG. 12B, also when the camera 5 is tilted, the object image incident on the imaging unit 24 can be prevented from changing by moving the shift lens 205 in a predetermined direction in accordance with the direction of tilt of the camera 5.

Figure 13:
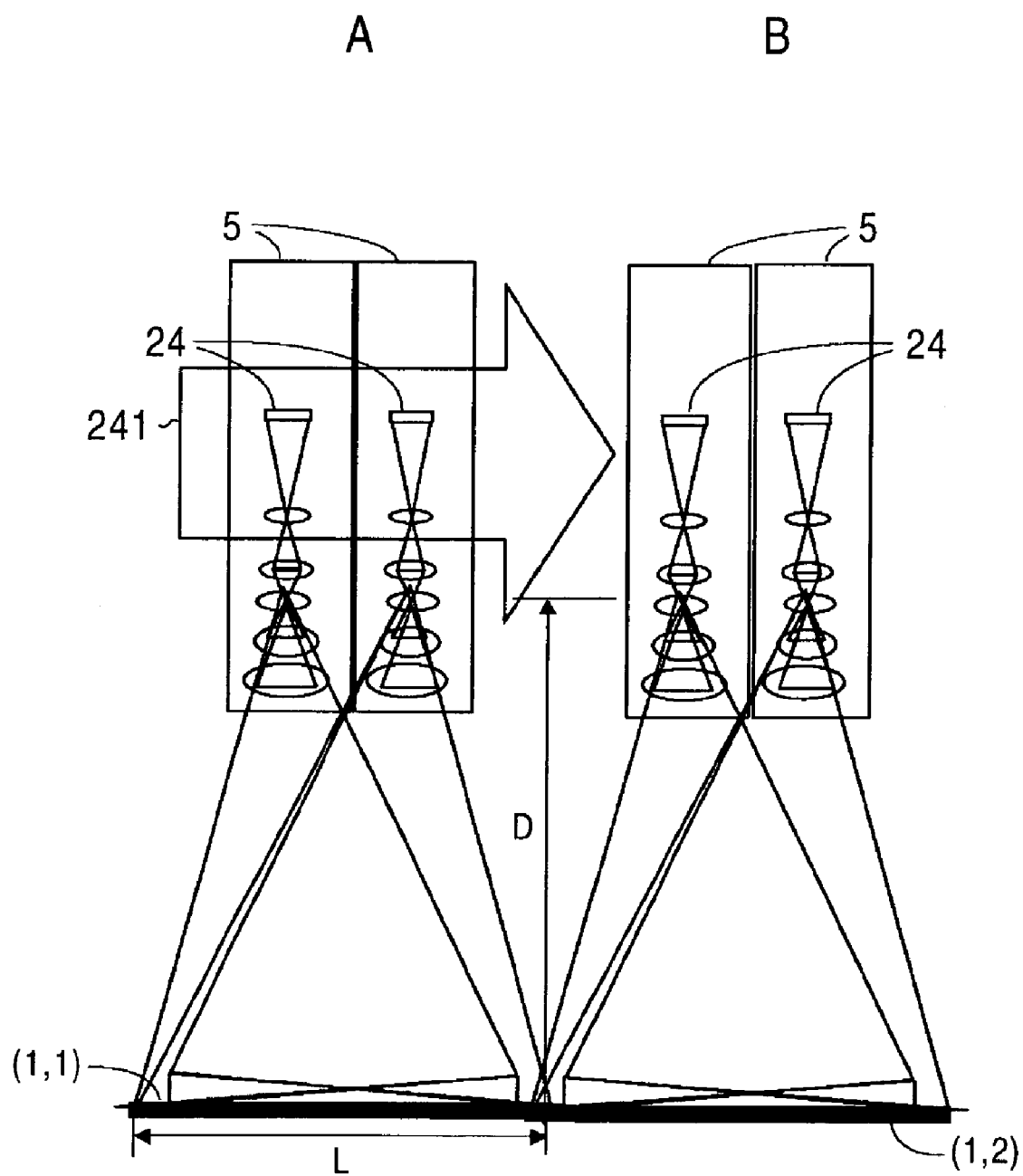
FIG. 13 is a schematic diagram showing the operation of a camera block according to another embodiment of the present invention.

Next, another embodiment of the present invention in which the camera 5 is mounted on a moving member other than the pan/tilter 4 will be described below with reference to FIG. 13. In order to facilitate the explanation, a case in which the moving member only moves the camera 5 in the horizontal plane is considered. The moving member is obtained by, for example, converting the rotational movement of the servomotor into a linear movement. In FIG. 13, frames at the coordinate positions (1, 1) and (1, 2), for example, are successively acquired, in that order.

The camera 5 is moved at a constant speed in the direction shown by an arrow denoted by reference numeral 241. When the camera 5 is in the moving area denoted by A in FIG. 13, the object image incident on the imaging unit 24 can be prevented from changing by moving the shift lens 205 in accordance with the movement of the camera 5. Accordingly, the frame at the coordinate position (1, 1) can be acquired.

Then, when the camera 5 is moved to a position where the adjacent frame at the coordinate position (1, 2) can be acquired (see B in FIG. 13), the object image incident on the imaging unit 24 can be prevented from changing by moving the shift lens 205 in accordance with the moving camera 5. Accordingly, the frame at the coordinate position (1, 2) can be acquired.

Accordingly, adjacent frames can be acquired irrespective of the types of moving members as long as the moving member can move the camera 5 at a constant speed.

The present invention is not limited to the above-described embodiments, and various modifications and applications are possible within the scope of the present invention.

For example, the system in which the computer 1 is connected to the camera units 3 with the LAN 7 in the above-described embodiment may also be constructed such that only the computer 1 and the camera units 3 are portable.

In addition, although the camera unit 3 is tilted downward to successively shoot the frames in the above-described embodiment, the camera unit 3 may also be tilted upward to successively shoot the frames. In addition, the camera unit 3 may also be panned rightward or leftward to successively shoot the frames.

In addition, although all of the lenses 203, 204, 206, and 207 and the shift lens 205 are convex lenses in the above-described embodiment, all of these lenses may also be concave lenses. In addition, convex lenses and concave lenses may also be used in combination.

In the present embodiment, in order to prevent the object image incident of the imaging unit 24 from changing, the shift lens 205 is moved in a predetermined direction in accordance with the direction of movement of the camera 5. However, the shift lens 205 may also be moved in the opposite direction depending on the construction of the lens unit 22, for example, depending on whether the lenses of the lens unit 22 are convex or concave, whether the refractive indexes thereof are greater or less than 1, etc.

Furthermore, although the frames are shot on the basis of the coordinate positions, they may also be shot on the basis of the position addresses.

What is claimed is:

1. A monitoring system comprising:
   an imaging unit for shooting an image;
   an optical-path changing element which changes an optical path from an object;

a shooting-direction changing unit which includes a servomotor as a drive source and changes a shooting direction of the imaging unit;
a storing unit which stores image data;
a display unit; and
a controller which stores an original image consisting of a plurality of still images shot in a plurality of shooting directions or a compressed image obtained by compressing the original image in the storing unit and displays an overall panoramic image generated from the original image or the compressed image on the display unit,
wherein, when a still image of a desired area is shot, the optical-path changing element is moved on the basis of the number of pulses applied to the servomotor such that an object image incident on the imaging unit does not change.

2. A monitoring system according to claim 1, wherein the time at which the still image is acquired is determined on the basis of a drive voltage applied to a motor for moving the optical-path changing element.

3. A monitoring method comprising the steps of:
shooting a plurality of still images in a plurality of shooting directions within a predetermined moving range in a maximum moving range of a shooting-direction changing unit which includes a servomotor as a drive source and changes a shooting direction of an imaging unit;
storing an original image consisting of the plurality of still images or a compressed image obtained by compressing the original image; and
displaying an overall panoramic image generated from the original image or the compressed image,
wherein, when a still image of a desired area is shot, an optical-path changing element which changes an optical path from an object is moved on the basis of the number of pulses supplied to the servomotor such that an object image incident on the imaging unit does not change.

4. A monitoring method according to claim 3, wherein the time at which the still image is acquired is determined on the basis of a drive voltage applied to a motor for moving the optical-path changing element.

5. An imaging apparatus comprising:
an imaging unit for shooting an image;
an optical-path changing element which changes an optical path from an object; and
a shooting-direction changing unit which includes a servomotor as a drive source and changes a shooting direction of the imaging unit,
wherein, when a still image of a desired area is shot, the optical-path changing element is moved on the basis of the number of pulses applied to the servomotor such that the object image incident on the imaging unit does not change.

6. An imaging apparatus according to claim 5, wherein the time at which the still image is acquired is determined on the basis of a drive voltage applied to a motor for moving the optical-path changing element.

7. An imaging system comprising:
an imaging unit for shooting an image;
a shooting-direction changing unit which includes a servomotor as a drive source and changes a shooting direction of the imaging unit;
a storing unit which stores image data;
a display unit;
a controller which stores an original image consisting of a plurality of still images shot in a plurality of shooting directions or a compressed image obtained by compressing the original image in the storing unit and displays an overall panoramic image generated from the original image or the compressed image on the display unit; and
designating means for designating a desired area in the overall panoramic image,
wherein the shooting direction is shifted to a direction corresponding to the designated area by changing a voltage applied to the servomotor,
wherein, when the a still image of a desired area is shot, the shooting-direction changing unit is moved on the basis of the number of pulses applied to the servomotor such that an object image incident on the imaging unit does not change.

8. An imaging system according to claim 7, wherein the time at which a shutter pulse is output is determined on the basis of a voltage applied to the servomotor.

9. A monitoring system, comprising:
imaging means for imaging an object to create an image;
optical-path changing means for changing an optical path from the object;
shooting-direction changing means for changing a shooting direction of the imaging unit, said shooting-direction changing means including a driving means for driving the imaging means;
storage means for storing an original image consisting of a plurality of still images shot in a plurality of shooting directions or a compressed image obtained by compressing the original image;
display means for displaying an overall panoramic image generated from the original image or the compressed image,
wherein, when a still image of a desired area is shot, the optical-path changing means is moved on the basis of the number of pulses applied to the driving means such that an object image incident on the imaging means does not change.

10. The monitoring system according to claim 9, wherein a time at which the still image is acquired is determined on the basis of a drive voltage applied to a motor means for moving the optical-path changing means.

11. An imaging apparatus, comprising:
imaging means for imaging an object to create an image;
optical-path changing means for changing an optical path from the object; and
shooting-direction changing means for changing a shooting direction of the imaging means, said shooting-direction changing means including a driving means for driving the imaging means,
wherein, when a still image of a desired area is shot, the optical-path changing means is moved on the basis of the number of pulses applied to the driving means such that the object image incident on the imaging means does not change.

12. The imaging apparatus according to claim 11, wherein a time at which the still image is acquired is determined on the basis of a drive voltage applied to a motor means for moving the optical-path changing means.

* * * * *